(12) United States Patent
Guering et al.

(10) Patent No.: US 10,822,073 B2
(45) Date of Patent: Nov. 3, 2020

(54) AIRCRAFT CONTROL COMPRISING A PEDAL COUPLED TO A CYLINDER AND ASSOCIATED CONTROL DEVICE

(71) Applicant: Airbus Operations (S.A.S.), Toulouse (FR)

(72) Inventors: Bernard Guering, Montrabe (FR); Laurent Saint-Marc, Montaigut sur Save (FR)

(73) Assignee: Airbus Operations (S.A.S.), Toulouse (FR)

( * ) Notice: Subject to any disclaimer, the term of this patent is extended or adjusted under 35 U.S.C. 154(b) by 404 days.

(21) Appl. No.: 15/377,646

(22) Filed: Dec. 13, 2016

(65) Prior Publication Data
US 2017/0166297 A1 Jun. 15, 2017

(30) Foreign Application Priority Data
Dec. 14, 2015 (FR) ...................................... 15 62263

(51) Int. Cl.
*B64C 13/04* (2006.01)
*B64C 13/36* (2006.01)
*B64C 13/44* (2006.01)

(52) U.S. Cl.
CPC ............ *B64C 13/044* (2018.01); *B64C 13/36* (2013.01); *B64C 13/44* (2013.01); *Y02T 50/44* (2013.01)

(58) Field of Classification Search
CPC ......... B64C 13/12; B64C 13/36; B64C 13/40; B64C 13/44
See application file for complete search history.

(56) References Cited

U.S. PATENT DOCUMENTS

| | | | | |
|---|---|---|---|---|
| 404,472 A | * | 6/1889 | Dunn .................... | F15B 7/005 60/571 |
| 1,935,004 A | * | 11/1933 | Winther, Jr. ........... | B64C 13/00 180/333 |
| 2,397,270 A | * | 3/1946 | Kelly ..................... | F02D 9/00 138/31 |
| 4,470,570 A | * | 9/1984 | Sakurai ................. | B64C 13/04 244/235 |
| 4,867,044 A | * | 9/1989 | Holtrop ................. | B29C 70/86 92/169.1 |
| 5,538,202 A | * | 7/1996 | Thornburg ............ | B64C 13/36 244/215 |
| 5,557,154 A | * | 9/1996 | Erhart ................... | F04B 7/00 310/68 B |

(Continued)

FOREIGN PATENT DOCUMENTS

EP 2 072 394 A2 6/2009
WO WO 01/11439 A1 2/2001

OTHER PUBLICATIONS

French Search Report for FR 15 62263 dated Aug. 23, 2016.

*Primary Examiner* — Michael H Wang
(74) *Attorney, Agent, or Firm* — Jenkins, Wilson, Taylor & Hunt, P.A.

(57) ABSTRACT

An aircraft control comprises a mobile pedal and comprises a cylinder coupled to the pedal such that a displacement of the pedal according to at least a first direction reduces the volume of a first chamber of the cylinder. A control device comprises a fluid type bus system connecting two aircraft controls. Additionally, an aircraft is equipped with such a control device.

6 Claims, 3 Drawing Sheets

(56) References Cited

U.S. PATENT DOCUMENTS

| | | | | |
|---|---|---|---|---|
| 5,806,806 A * | 9/1998 | Boehringer | .......... | G05D 1/0077 |
| | | | | 244/196 |
| 5,900,710 A * | 5/1999 | Gautier | ................ | B64C 13/503 |
| | | | | 244/223 |
| 6,572,055 B1 * | 6/2003 | Bernard | .................. | B64C 13/12 |
| | | | | 244/229 |
| 6,651,930 B1 * | 11/2003 | Gautier | .................. | B64C 13/40 |
| | | | | 244/78.1 |
| 6,986,249 B2 * | 1/2006 | Bernard | .................. | B64C 13/12 |
| | | | | 60/571 |
| 2009/0159756 A1 * | 6/2009 | Christensen | ............ | B64C 13/12 |
| | | | | 244/226 |
| 2013/0299414 A1 * | 11/2013 | Kress | .................. | B01D 29/114 |
| | | | | 210/338 |
| 2015/0232171 A1 * | 8/2015 | Le Borgne | ............. | B64D 33/00 |
| | | | | 416/23 |

* cited by examiner

AIRCRAFT CONTROL COMPRISING A PEDAL COUPLED TO A CYLINDER AND ASSOCIATED CONTROL DEVICE

CROSS-REFERENCE TO RELATED APPLICATION

This application claims priority to French Patent Application FR 15 62263 filed Dec. 14, 2015, the entire disclosure of which is incorporated by reference herein.

TECHNICAL FIELD

The subject matter herein relates to an aircraft control comprising a pedal coupled to a cylinder and an associated control device.

BACKGROUND

According to conventionally known aircraft controls, particularly aircraft brake controls, if one of the pilots exerts a force/movement pair on one or both pedals, the other pilot is able to get feedback of this information directly through the pedals. Aircraft controls known according to the prior art are reliable, as they have a mechanical architecture of kinematic chains and bus systems, however they are relatively complex, bulky and heavy. The disclosure herein remedies such drawbacks associated with aircraft controls of the prior art.

SUMMARY

FIG. 1 represents a control device that is positioned in a cockpit of an aircraft and which comprises two sets of controls 10 and 10'. More precisely, a first set of controls 10 is positioned facing a first flight station and a second set of controls 10' is positioned facing a second flight station. Each set of controls 10, 10' is also referred to as the rudder bar. FIG. 1 represents a partial view of a rudder bar, although the rudder control monitoring and transmission systems are not represented.

According to an embodiment, each set of controls 10 (or 10') comprises a first pedal 12 (or 12') and a second pedal 14 (or 14') which can be actuated simultaneously or independently of one another.

According to an embodiment shown in FIG. 1, in the case of a braking control, for each set of controls 10 (or 10'), the first and second pedals 12, 14 (or 12', 14') are connected to the same braking intensity sensor 15 with two independent input channels, by two kinematic chains 18 and 20 independent of one another.

According to an embodiment shown in FIGS. 1 and 2, each kinematic chain 18, 20 comprises:
- a first shaft 22 integral with the pedal 12 or 14, pivoting in relation to a support 16 according to a first transverse axis of rotation A22, the shaft 22 comprising a radial extension 24 which extends perpendicularly to the axis of rotation A22;
- a first lever 26 rotationally mobile according to a second transverse axis of rotation A26, the first lever 26 being connected to the radial extension 24 by a first connecting rod 28;
- a second lever 30 integral with a second shaft 32 pivoting according to a third transverse axis of rotation A32, the second lever 30 being connected to the first lever 26 by a second connecting rod 34;
- the second shaft 32 having a first arm 36 which extends perpendicularly to the axis of rotation A32 and which is connected by a third connecting rod 38 to the braking intensity sensor 15.

According to an embodiment, the braking intensity sensor 15 comprises two pivot levers 40, one for each pedal, each of which is connected to the third link 38 of the corresponding kinematic chain.

When a force is exerted on the pedal 12, the kinematic chain transforms the rotary motion of the pedal 12 about the axis of rotation A22 into a proportional rotary motion of the rotating lever 40 of the braking intensity sensor 15.

The second shaft 32 comprises a second arm 42 which extends perpendicularly to the axis of rotation A32. In operation, this second arm 42 pivots in a pivoting plane between two stops 44, 44' which delimit the range of rotation of the pedal. In FIG. 2, the stop 44 corresponds to a rest position of the pedal and the stop 44' corresponds to an end of travel position of the pedal (maximum braking).

The kinematic chain 18 or 20 comprises a return 46, such as a tension spring for example, which is configured to maintain the second arm 42 against the stop 44 corresponding to the rest position of the pedal. This return 46 exerts a force on the second arm 42 that is opposite and proportional to that generated on the pedal.

The control device also comprises a first bus system 48 that connects the first pedals 12, 12' of the two sets of controls 10 and 10' and a second bus system 50 that connects the seconds pedals 14, 14' of the two sets of controls 10 and 10'.

Each bus system 48 and 50 comprises:
- at the level of a pedal of a first set of controls 10, a third shaft 52 pivoting according to a longitudinal axis of rotation A52 that has, at a first end, a first arm 54 which extends perpendicularly to the axis of rotation A52 and which is connected by a connecting rod 56 to the second lever 30 of the kinematic chain and, at a second end, a second arm 58 which extends perpendicularly to the axis of rotation A52,
- at the level of a pedal of a second set of controls 10', a fourth shaft 60 pivoting according to a longitudinal axis of rotation A60 that has, at a first end, a third arm 62 which extends perpendicularly to the axis of rotation A60 and which is connected by a connecting rod (not visible in FIG. 1) to the second lever 30 of the kinematic chain and, at a second end, a fourth arm 64 which extends perpendicularly to the axis of rotation A60,
- a bus rod 66 which connects the second arm 58 and the fourth arm 64.

The bus system 48 (and/or 50) allows, if a force/movement pair is exerted on a first pedal 12 (and/or on a second pedal 14), a first set of controls 10 to induce a force/movement pair on the first pedal 12' (and/or the second pedal 14') of the second set of controls 10' or vice versa.

Thus, if one of the pilots exerts a force/movement pair on one or both pedals, the other pilot is able to get feedback of this information directly through the pedals.

Given the purely mechanical architecture of the kinematic chains and the bus systems, the brake control devices of the prior art are reliable. However, they are relatively complex, bulky and heavy.

The disclosure herein aims to remedy the drawbacks of the prior art.

For this purpose, the disclosure herein relates to an aircraft control system which comprises a mobile pedal and wherein it comprises a cylinder that comprises a body in which a piston slides, delimiting a first chamber and second chamber, the cylinder being coupled to the pedal such that a displacement of the pedal in at least a first direction reduces the volume of the first chamber (98.1 to 98.4) of the cylinder (82.1 to 82.4).

The coupling of a pedal and a cylinder allows a simple, reliable control to be obtained, with reduced weight and overall dimensions.

Advantageously, the piston comprises a rod and a coaxial extension to the rod, the rod and the extension being arranged on either side of the piston, the extension being configured to slide in a hollow rod of the body.

Preferably, the cylinder comprises a device such as a position sensor such for measuring the displacement of a rod integral with the piston relative to the body.

According to another feature, the cylinder comprises at least one stop configured to limit the stroke of the piston.

Advantageously, the pedal is mobile between a rest position and an active position and the cylinder comprises a return configured to reposition the pedal in rest position.

According to an embodiment, the first chamber of the cylinder comprises at least one inlet/outlet port and the second chamber comprises at least one inlet/outlet port and at least one of the inlet/outlet ports comprise an adjustable diaphragm configured to allow adjustment of the laminarity of the fluid exiting the associated first or second chamber.

The disclosure herein also relates to a control device comprising at least one bus system connecting a control in accordance with the disclosure herein belonging to a first set of controls and a control according to the disclosure herein belonging to a second set of controls. The control device wherein the bus system comprises:

- a first line that connects the first chamber of the control of the first set of controls to the second chamber of the control of the second set of controls,
- a second line that connects the second chamber of the control of the first set of controls to the first chamber of the control of the second set of controls.

According to another feature, the first and second chambers of the cylinders and the first and second lines of the bus system are filled with an incompressible fluid. The fluid is preferably at atmospheric pressure.

Finally, the disclosure herein also relates to an aircraft equipped with a control device according to the disclosure herein.

BRIEF DESCRIPTION OF THE DRAWINGS

Other features and advantages will become apparent from the following description, given by way of example only, with reference to the accompanying drawings in which.

DETAILED DESCRIPTION

Figure 1:
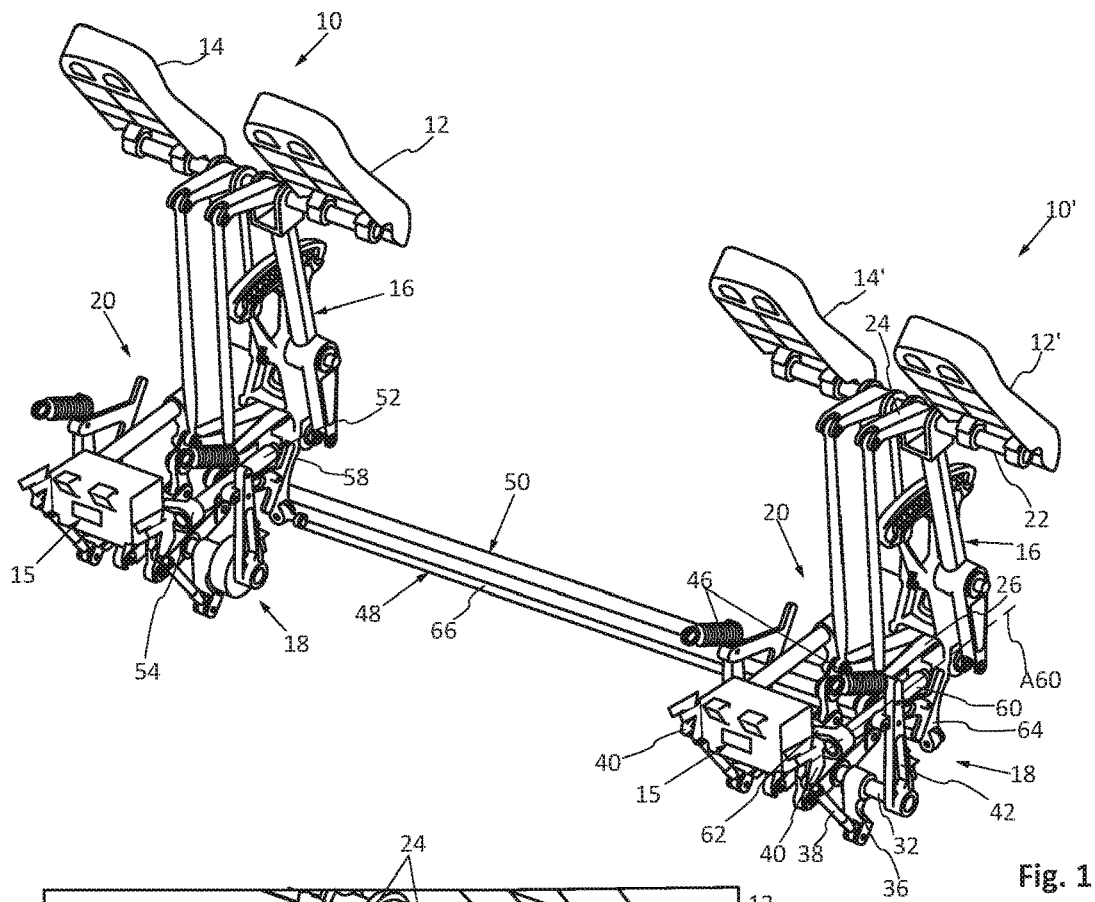
FIG. 1 is a perspective view of a control device that illustrates an embodiment of the prior art.
Figure 2:
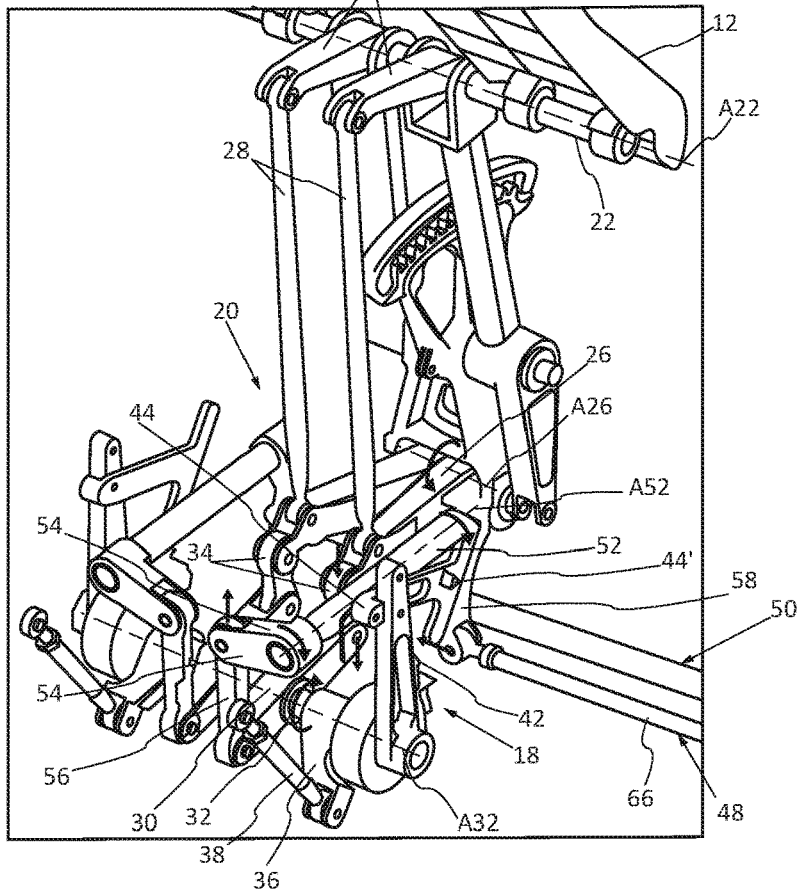
FIG. 2 is a perspective view of a set of controls that illustrates in detail the embodiment of FIG. 1.
Figure 3:
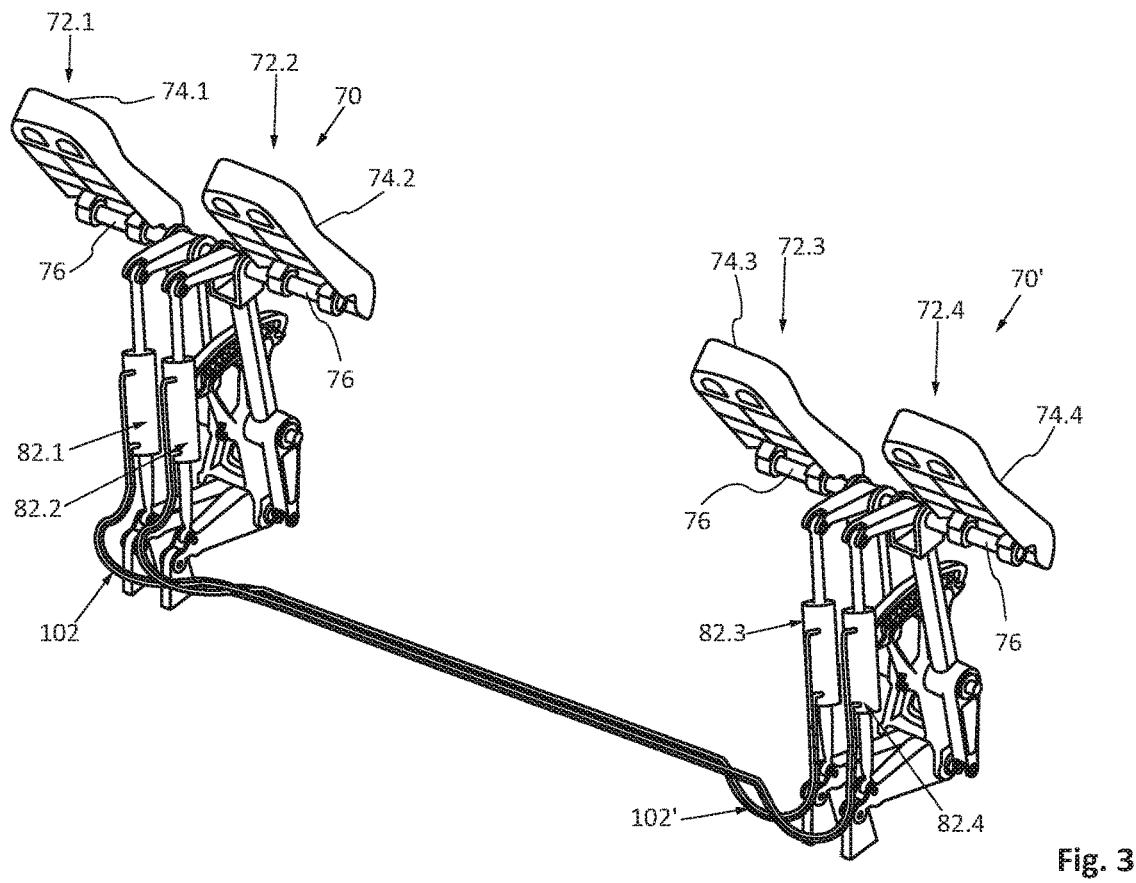
FIG. 3 is a perspective view of a control device that illustrates an embodiment of the disclosure herein.

FIG. 3 represents a control device that is positioned in a cockpit of an aircraft and which comprises two sets of controls 70, 70'.

The first set of controls 70 is positioned facing a first flight station and the second set of controls 70' is positioned facing a second flight station.

Each set of controls 70, 70' comprises a first control 72.1, 72.2 and a second control 72.3, 72.4.

Regardless of the variant, each set of controls comprises at least one control.

According to a configuration, controls 72.1 to 72.4 are braking controls.

Figure 4:
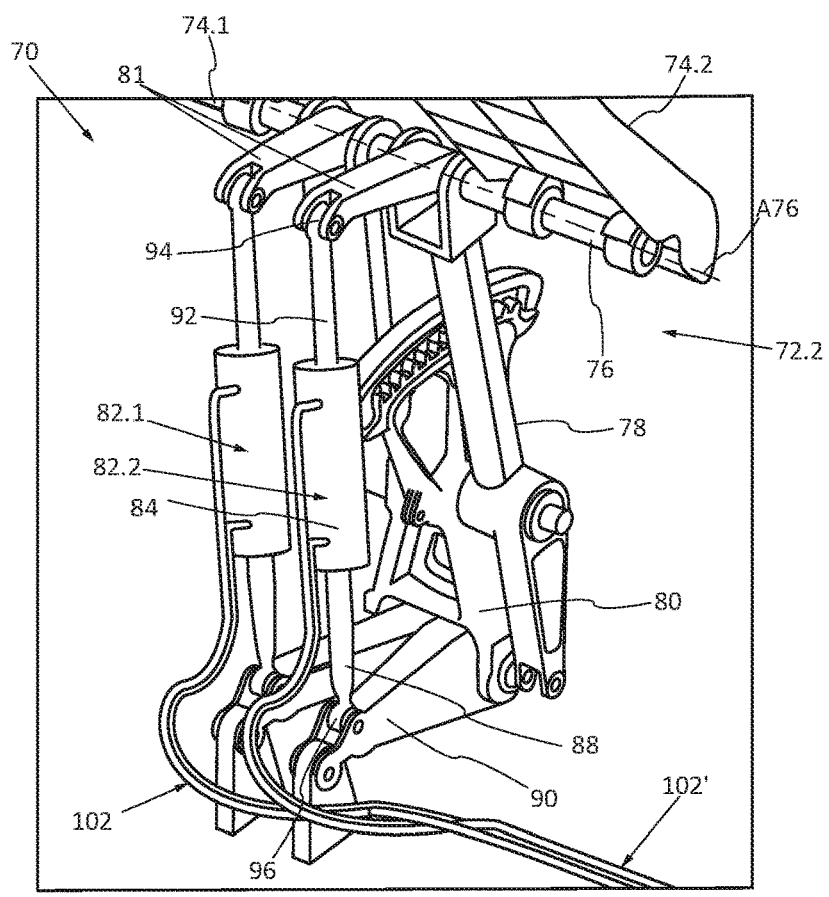
FIG. 4 is a perspective view of a set of controls that illustrates in detail the embodiment of FIG. 3.

According to an embodiment shown in FIGS. 3 and 4, each control 72.1 to 72.4 comprises a pedal 74.1 to 74.4 attached to a first shaft 76 pivoting in relation to a support 78 (also called the pedal arm) according to an axis of rotation A76 oriented in a first direction. For the remainder of the description, the first direction is referred to as transverse.

Each pedal 74.1 to 74.4 is mobile between a rest position and an active position.

Preferably, the support 78 is mobile relative to a chassis 80 to enable the position of each pedal 74.1 to 74.4 to be adjusted with respect to the flight station.

The first shaft 76 comprises a radial extension 81 which extends in a direction perpendicular to the transverse direction.

Figure 5:
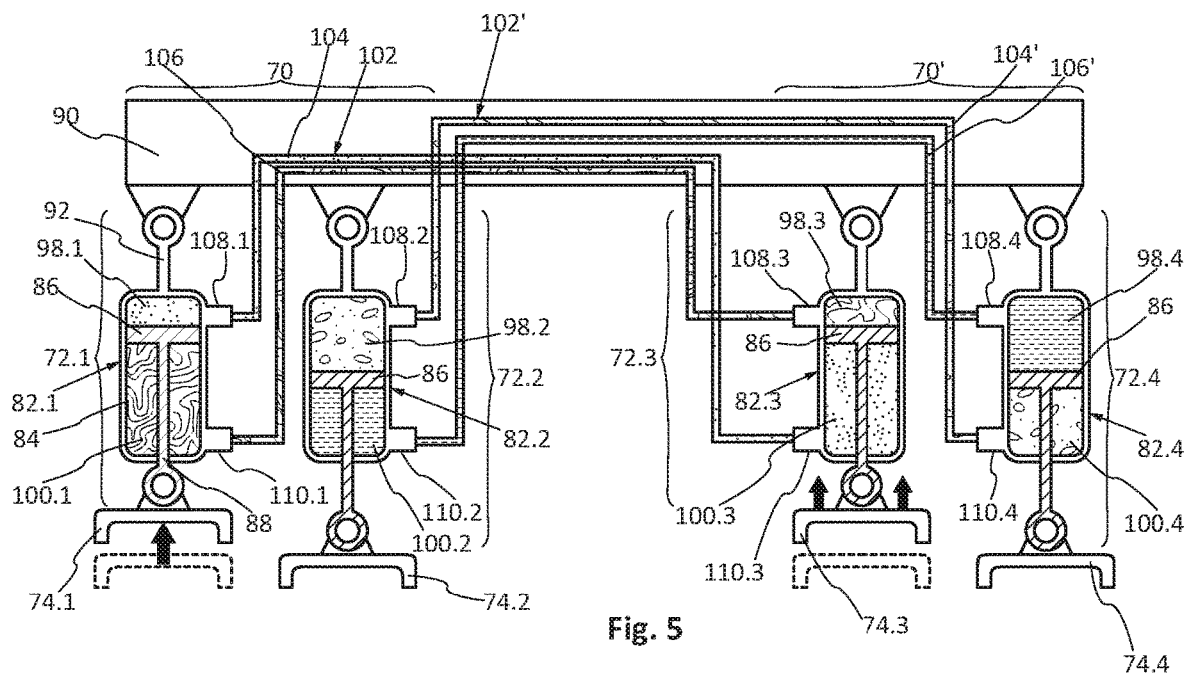
FIG. 5 is a hydraulic diagram illustrating a coupling between two sets of controls when only one pedal is pressed.

According to a feature of the disclosure herein, each control 72.1 to 72.4 comprises a cylinder 82.1 to 82.4 which comprises a body 84 in which a piston 86, visible in FIG. 5, slides. The body 84 is connected to the radial extension 81 and the piston 86 comprises a rod 88 connected to a base 90, as illustrated in FIG. 4. Alternatively, the body 84 is connected to the base 90 and the rod 88 of the piston 86 to the radial extension 81, as illustrated in FIG. 4.

According to an embodiment, the body 84 comprises a rod 92 coaxial with the rod 88 of the piston 86, the rod 92 of the body 84 comprising a first end connected to the body 84 and a second end having a ball head 94.

According to an embodiment, the rod 88 of the piston 86 comprises a first end connected to the piston 86 and a second end having a ball head 96.

Additionally, both the base 90 and the radial extension 81 comprise a yoke configured to receive a ball head 94 or 96 and a pin is provided to connect each ball head 94 or 96 to its yoke.

Of course, the disclosure herein is not limited to this embodiment for the connections between the body 84 and the radial extension 81 (or the base 90) and the rod 88 of the piston 86 and the base 90 (or the radial extension 81). Regardless of the embodiment chosen, these connections are at least of swivelling type.

Figure 6:
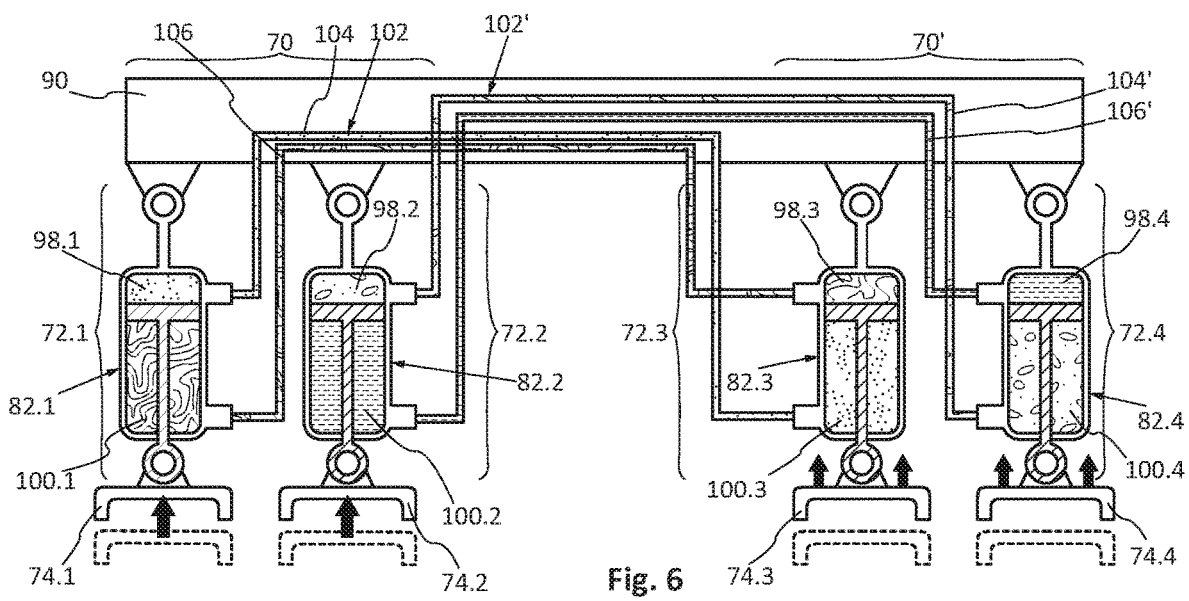
FIG. 6 is a hydraulic diagram illustrating a coupling between two sets of controls when two pedals are pressed.

As illustrated in FIGS. 5 and 6, each cylinder 82.1 to 82.4 comprises a first chamber 98.1 to 98.4 and a second chamber 100.1 to 100.4, separated from the first chamber 98.1 to 98.4 by the piston 86.

Regardless of the variant, a control 72.1 to 72.4 comprises a mobile pedal 74.1 to 74.4 coupled to a cylinder 82.1 to 82.4 so that a displacement of the pedal in at least a first direction decreases the volume of a first chamber 98.1 to 98.4 of the cylinder (and therefore the increase in volume of the second chamber 100.1 to 100.4).

According to a feature of the disclosure herein, the cylinders 82.1 to 82.4 are double-acting type cylinders. This type of cylinder makes it possible to avoid cavitation phenomena likely to appear with single-acting type cylinders. Furthermore, in the case of two single-action cylinders mounted in opposition, the reactions of the coupled pedals will not be identical. Pressing a first pedal will thus generate a force that will increase proportionally to the depression whereas for a second coupled pedal, it will be depressed while exhibiting a resistance to the depression that will decrease proportionally to the depression. Both pilots will thus not perceive the forces generated on the coupled pedals in the same way.

According to a configuration, for each control, the first direction corresponds to the depression of the mobile pedal that moves from the rest position to the active position. Each mobile pedal 74.1 to 74.4 is configured to passively move in a second direction opposite the first direction, pushed by the increasing volume in the corresponding first chamber 98.1 to 98.4.

The control device comprises a first bus system 102 that connects a first control 72.1 of a first set of controls 70 to a first control 72.3 of a second set of controls 70'.

In addition, the control device comprises a second bus system 102' that connects a second control 72.2 of a first set of controls 70 to a second control 72.4 of a second set of controls 70'.

According to a feature of the disclosure herein, the first bus system 102 comprises:
- a first line 104 that connects the first chamber 98.1 of the first control 72.1 of the first set of controls 70 to the second chamber 100.3 of the first control 72.3 of the second set of controls 70',
- A second line 106 that connects the second chamber 100.1 of the first control 72.1 of the first set of controls 70 to the first chamber 98.3 of the first control 72.3 of the second set of controls 70'.

In the same manner, the second bus system 102' comprises:
- a first line 104' that connects the first chamber 98.2 of the second control 72.2 of the first set of controls 70 to the second chamber 100.4 of the second control 72.4 of the second set of controls 70',
- A second line 106' that connects the second chamber 100.2 of the second control 72.2 of the first set of controls 70 to the first chamber 98.4 of the second control 72.4 of the second set of controls 70'.

According to an embodiment, each first chamber 98.1 to 98.4 comprises at least one inlet/outlet port 108.1 to 108.4 and every second chamber 100.1 to 100.4 comprises at least one inlet/outlet port 110.1 to 110.4, each inlet/outlet port being sealingly connected to one of the first and second lines 104, 104', 106, 106'.

Preferably, the first and second chambers 98.1 to 98.4 and 100.1 to 100.4 and the first and second lines 104, 104', 106, 106' are filled with an incompressible fluid, at atmospheric pressure when no pedal is pressed.

Functionally, as illustrated in FIG. 5, when a pilot presses the first pedal 74.1 of a first set of controls 70, the piston 86 of the cylinder 82.1 coupled to the pedal 74.1 moves causing a decrease in volume of the first chamber 98.1 of the cylinder 82.1 and an increase in volume of the second chamber 100.1 of the cylinder 82.1. This change in volume in the cylinder 82.3 generates a decrease in volume of the first chamber of 98.3 of the cylinder 82.3 and an increase in volume of the second chamber 100.3 of the cylinder 82.3 and the displacement of the piston 86 of the cylinder 82.3, the fluid contained in the various lines and chambers being incompressible, the first chamber 98.1 and the second chamber 100.1 of the cylinder 82.1 being connected by lines 104 and 106, respectively, to the second chamber 100.3 and the first chamber of 98.3 of the cylinder 82.3.

As the cylinder 82.3 is coupled to the first pedal 74.3 of the second set of controls 70', this change in volume of the first and second chambers 98.3 and 100.3 of the cylinder 82.3 causes a depression of the first pedal 74.3 of the second set of controls 70' proportional to the force/movement pair exerted on the first pedal 74.1 of the first set of controls 70.

As illustrated in FIG. 6, when a pilot pushes both pedals 74.1 and 74.2 of a first set of controls 70, the bus systems 102 and 102' simultaneously cause the depression of both pedals 74.3 and 74.4 of the second set of controls 70'.

According to the disclosure herein, when a force/movement pair is exerted on a first pedal 74.1 (and/or on a second pedal 74.2) of a first set of controls 70, a force/movement pair is exerted on the first pedal 74.3 (and/or on the second pedal 74.4) of the second set of controls 70' or vice versa. Thus, if one of the pilots exerts a force/movement pair on one or both pedals, the other pilot is able to get feedback of this information directly through the pedals.

The coupling of a pedal and a cylinder allows a simple, reliable control to be obtained, with reduced weight and overall dimensions. The use of fluid type bus systems allows a simple, reliable control device to be obtained with reduced weight and overall dimensions.

Figure 7:
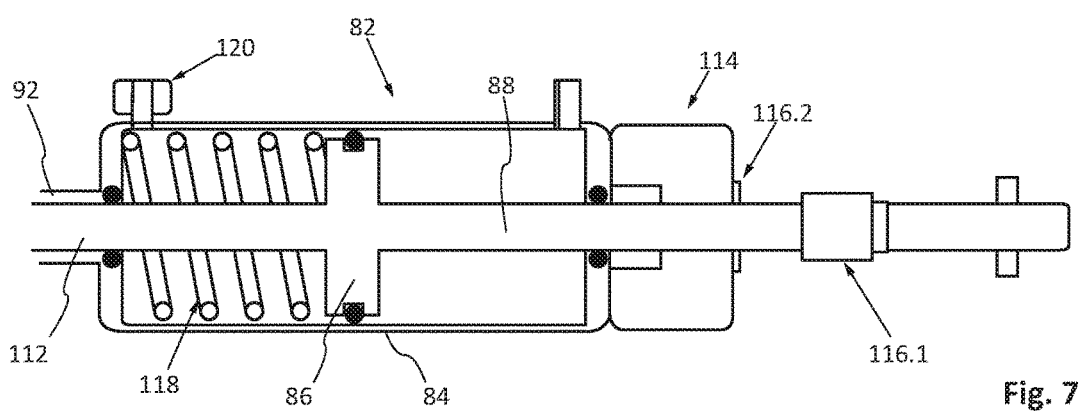
FIG. 7 is a sectional view of a cylinder of a control that illustrates an embodiment of the disclosure herein.

According to a variant shown in FIG. 7, for at least one cylinder 82 and preferably all cylinders, the piston 86 comprises, in addition to a rod 88, an extension 112 coaxial with the rod 88, the rod 88 and the extension 112 being arranged on either side of the piston 86. In addition, the rod 92 of the body 84 is hollow and the extension 112 is configured to slide in the hollow rod 92. This arrangement makes it possible to obtain first and second chambers with identical volumes which makes it possible to obtain identical movements for both pedals coupled by the same bus system. According to another advantage, the extension 112 improves the buckling resistance of the cylinder/piston/rod assembly.

Advantageously, each cylinder comprises a device such as a position sensor 114 for measuring the displacement of the rod 88 of the piston 86 in relation to the body 84. According to an embodiment, the position sensor 114 is an inductive type position sensor integral with the body 84 and traversed by the rod 88. Each value determined by the position sensor 114 is transmitted to a computer configured to manage the braking force.

Preferably, each cylinder comprises at least one stop 116.1, 116.2 to limit the stroke of the piston 86. As the pedal is linked to the rod 88 of the piston, the stop or stops 116.1 and 116.2 can be used to limit the travel of the pedal. According to a first embodiment, the stop 116.1 is a screw bushing that screws onto the rod 88 of the piston. According to a second embodiment, the stop 116.2 is a thrust washer with a thickness determined according to the desired distance of travel of the pedal. These two embodiments can be combined, the screw bushing providing the adjustment function and the washer having only a support function.

According to another feature, the cylinder comprises a return 118 configured to reposition the pedal in the rest position when the pedal is in active position. Preferably, the return is positioned in the chamber, the volume of which decreases when the pedal transitions from the rest position to the active position. According to an embodiment, this return 118 is a compression spring. This arrangement allows a displacement resisting force to be obtained against a pedal depression action.

In addition to or as a replacement for the extension 112, the return 118 can be used to balance the volume of the chambers arranged on either side of the piston 86, which allows identical movement to be obtained for both pedals coupled by the same bus system.

According to another feature, at least one inlet/outlet port of a first and/or second chamber of at least one cylinder comprises an adjustable diaphragm 120 configured to allow adjustment of the laminarity of the fluid exiting the associated first or second chamber. Advantageously, the inlet/outlet port of the chamber of the cylinder, the volume of which decreases when the pedal moves from the rest position to the active position, is equipped with an adjustable diaphragm 120. This adjustment of the laminarity creates a loss of adjustable hydraulic head proportional to the speed at which the pedal is depressed. This configuration gives the pilot feedback of the resisting force which increases with the speed of depression.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control device comprising:
   at least one bus system;
   a first control associated with a first set of controls; and
   a second control associated with a second set of controls,
   wherein each control comprises:
      a mobile pedal; and
      a cylinder comprising a body;
      a piston attached to a rod that passes through a first longitudinal end of the cylinder, so that the piston is slidable within the cylinder;
      wherein the cylinder comprises a first chamber and a second chamber, the first chamber being located on an opposite side of the piston from the second chamber and the second chamber being located between the piston and the first longitudinal end of the cylinder; and
      wherein the cylinder is coupled to the pedal such that a displacement of the pedal in at least a first direction reduces a volume of the first chamber of the cylinder; and
   wherein the bus system comprises:
      a first line that connects the first chamber of the first control to the second chamber of the second control, and
      a second line that connects the second chamber of the first control to the first chamber of the second control.

2. The control device according to claim 1, wherein the first and second chambers of the cylinders and the first and second lines of the bus system are filled with an incompressible fluid.

3. The control device according to claim 2, wherein the incompressible fluid is at atmospheric pressure.

4. The control device according to claim 1, wherein the first and second chambers are separated from each other on opposite sides of the piston.

5. An aircraft comprising a control device, which comprises:
   a first aircraft control comprising:
      a first mobile pedal; and
      a first cylinder comprising a body;
      a first piston attached to a first rod that passes through a first longitudinal end of the first cylinder, so that the first piston is slidable within the first cylinder;
      wherein the first cylinder comprises a first chamber and a second chamber, the first chamber of the first cylinder being located on an opposite side of the first piston from the second chamber of the first cylinder and the second chamber of the first cylinder being located between the first piston and the first longitudinal end of the first cylinder; and
      wherein the first cylinder is coupled to the first pedal such that a displacement of the first pedal according to at least a first direction reduces a volume of the first chamber of the first cylinder;
   a second aircraft control comprising:
      a second mobile pedal; and
      a second cylinder comprising a body;
      a second piston attached to a second rod that passes through a first longitudinal end of the second cylinder, so that the second piston is slidable within the second cylinder;
      wherein the second cylinder comprises a first chamber and a second chamber, the first chamber of the second cylinder being located on an opposite side of the second piston from the second chamber of the second cylinder and the second chamber of the second cylinder being located between the second piston and the first longitudinal end of the second cylinder; and
      wherein the second cylinder is coupled to the second pedal such that a displacement of the second pedal according to at least the first direction reduces a volume of the first chamber of the second cylinder; and
   a bus system which connects the first aircraft control and the second aircraft control, the bus system comprising:
      a first line that connects the first chamber of the first cylinder to the second chamber of the second cylinder, and
      a second line that connects the second chamber of the first cylinder to the first chamber of the second cylinder.

6. The aircraft according to claim 5, wherein the first and second chambers of the first cylinder are separated from each other on opposite sides of the first piston, and wherein the first and second chambers of the second cylinder are separated from each other on opposite sides of the second piston.

* * * * *